United States Patent
Schmidt et al.

(10) Patent No.: US 10,015,219 B2
(45) Date of Patent: Jul. 3, 2018

(54) MULTICASTING ADAPTIVE BITRATE STREAMS

(71) Applicant: Verizon Patent and Licensing Inc., Arlington, VA (US)

(72) Inventors: Johannes P. Schmidt, Los Altos Hills, CA (US); Punitma Malhotra, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 189 days.

(21) Appl. No.: 15/055,078

(22) Filed: Feb. 26, 2016

(65) Prior Publication Data

US 2017/0251034 A1 Aug. 31, 2017

(51) Int. Cl.
*H04L 29/06* (2006.01)
*H04L 29/08* (2006.01)

(52) U.S. Cl.
CPC ........ *H04L 65/4076* (2013.01); *H04L 65/608* (2013.01); *H04L 65/80* (2013.01); *H04L 67/02* (2013.01)

(58) Field of Classification Search
CPC ............. H04L 61/2069; H04L 65/4076; H04L 65/608; H04L 65/80; H04L 67/02; H04N 21/812; H04N 21/25891; H04N 21/6408; H04N 21/23424; H04N 21/44016; H04N 21/2668
USPC ........................................................ 709/219
See application file for complete search history.

(56) References Cited

U.S. PATENT DOCUMENTS

| | | | | |
|---|---|---|---|---|
| 8,392,956 | B2 * | 3/2013 | Ramakrishnan . | H04N 21/26616 386/291 |
| 9,674,245 | B2 * | 6/2017 | Karthikeyan ....... | H04L 65/4084 |
| 2009/0106792 | A1 * | 4/2009 | Kan ................... | H04N 7/17318 725/34 |
| 2009/0307732 | A1 * | 12/2009 | Cohen .................... | G06Q 30/02 725/87 |
| 2012/0005704 | A1 * | 1/2012 | Debois ............. | H04N 21/25891 725/35 |
| 2012/0259994 | A1 * | 10/2012 | Gillies ................ | H04L 12/1881 709/231 |
| 2013/0347033 | A1 * | 12/2013 | Grab .................... | H04N 21/458 725/34 |
| 2014/0358670 | A1 * | 12/2014 | Lefevre ................ | H04N 21/812 705/14.44 |
| 2016/0149980 | A1 * | 5/2016 | Karthikeyan ....... | H04L 65/4076 709/219 |
| 2016/0294898 | A1 * | 10/2016 | Wheelock ........... | H04L 65/4076 |

* cited by examiner

*Primary Examiner* — Ruolei Zong

(57) ABSTRACT

Content providers, such as television companies, may multicast adaptive bitrate content, using playlist-oriented streaming techniques, to recipient devices (such as set-top boxes ("STBs")). In a playlist-oriented streaming technique, segment files (e.g., segments of the content) may correspond to predetermined time segments. In order to mitigate lag time, when a channel is selected by a user of an STB, which may ordinarily be caused by the nature of playlist-oriented streaming techniques, an STB may obtain content, associated with the selected channel, via a unicast, non-playlist-oriented technique. Once the next segment file has been received by the STB, the STB may cease obtaining the content by the unicast technique, and may use the segment files received via multicast.

20 Claims, 11 Drawing Sheets

Multicasting high- and
low-bitrate segments

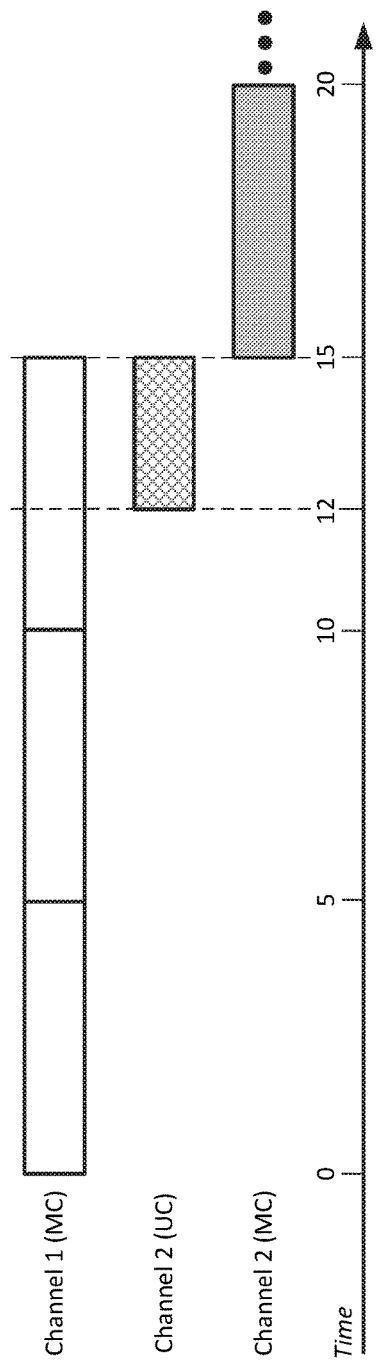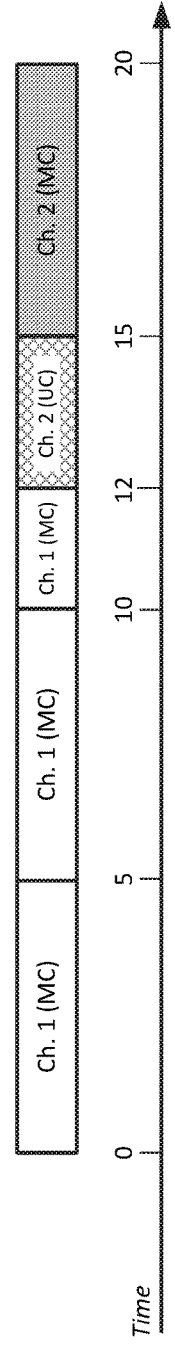
Fig. 6A
Fig. 6B

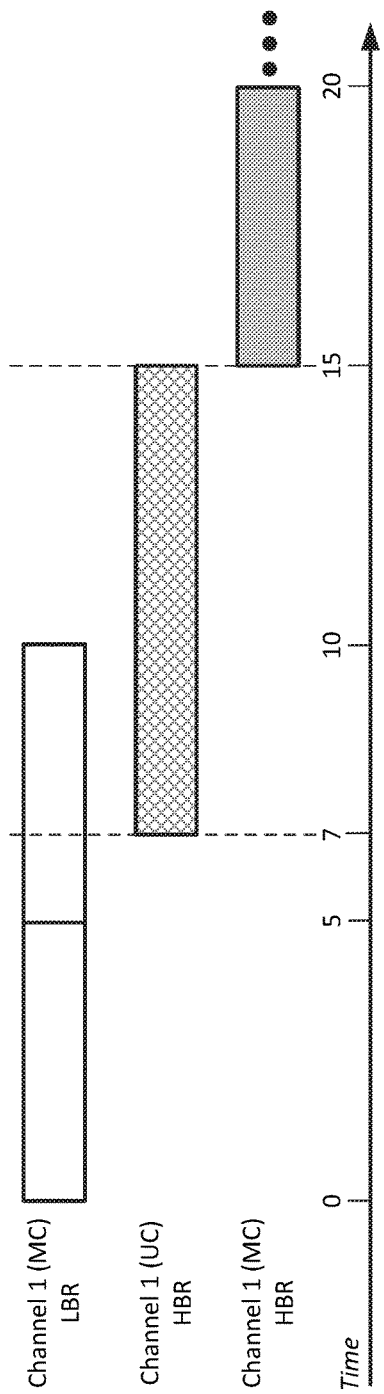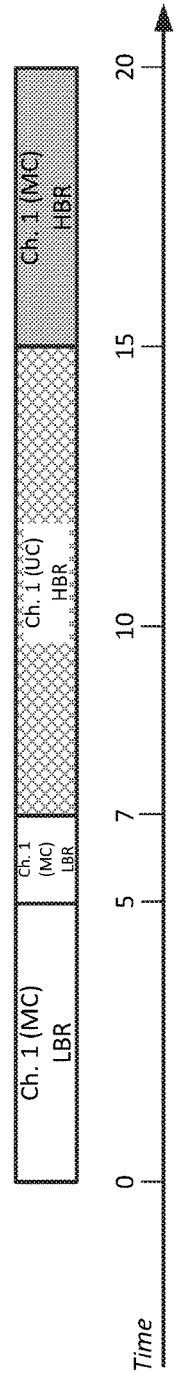
Fig. 8A
Fig. 8B

MULTICASTING ADAPTIVE BITRATE STREAMS

BACKGROUND

Content providers, such as television companies, streaming video providers, and the like, seek to provide content to users with the highest quality of experience ("QoE") possible. For instance, when changing channels, users' QoE may be enhanced by relatively fast response when the user selects a new channel. Conversely, "lag time," when changing channels, may be frustrating for the user and may reduce his or her QoE. Content providers also generally balance the desire for a high user QoE with a low cost of delivery, which may be achieved by reducing the consumption of network resources (e.g., bandwidth) or processing resources associated with providing the content to users.

BRIEF DESCRIPTION OF THE DRAWINGS

FIGS. 6A and 6B conceptually illustrate the use of unicast to supplement the delivery of streaming multicast content when changing or selecting channels;

FIGS. 8A, 8B, 9A, and 9B conceptually illustrate the use of unicast to supplement the delivery of streaming multicast content when changing bitrates of the content;

DETAILED DESCRIPTION OF PREFERRED EMBODIMENTS

Figure 1A:
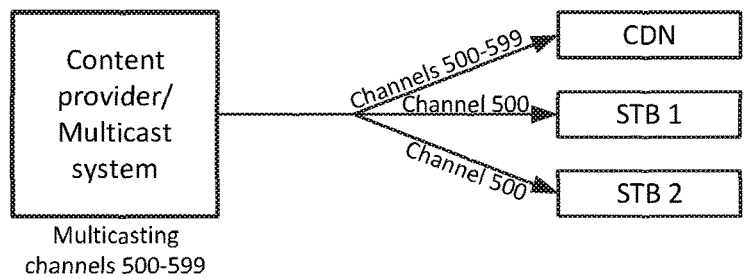
FIGS. 1A-1C and 2A-2D illustrate an example overview of one or more implementations described herein, in which a hybrid unicast/multicast technique may be used to provide streaming content to users.

The following detailed description refers to the accompanying drawings. The same reference numbers in different drawings may identify the same or similar elements.

One technique, available to content providers, to provide reasonable QoE to users while efficiently using network resources, is to broadcast or multicast content. Using broadcast or multicast, a content provider may output a video stream over one logical channel, which may be distributed to multiple devices (e.g., set-top boxes ("STBs"), mobile telephones, tablet computers, media devices, etc.).

Another technique, which may be used by content providers, is a playlist-oriented streaming technique, in which distinct portions of a particular item of content are associated with discrete files. For example, the first four seconds of a movie may be associated with a first file, the next four seconds of the movie may be associated with a second file, and so on. A "playlist" may indicate, to recipient devices, which file corresponds to which portion of the content (e.g., where a portion of the content is referred to herein as a "segment" or a "time segment"). These files are referred to, herein, as "segment files" (e.g., the first segment file in the above example contains content that corresponds to the first four-second segment of the movie, the second segment file contains content that corresponds to the next four-second segment, etc.). Examples of currently-existing playlist-oriented streaming techniques include HLS (Hypertext Transfer Protocol ("HTTP") Live Streaming) and MPEG-DASH (Motion Picture Experts Group ("MPEG") Dynamic Adaptive Streaming over HTTP ("DASH")).

In contrast to playlist-oriented streaming techniques, other techniques (referred to, herein, as "non-playlist-oriented" streaming techniques), may be used by content providers. For example, a content provider may output streaming content using an MPEG transport stream ("MPEG-TS"). In contrast with playlist-oriented streaming techniques, non-playlist-oriented streaming techniques may be able to be started at arbitrary points in the content. For example, referring to the above example, while delivery of segment files may be limited to blocks of four seconds each, non-playlist-oriented streaming techniques may allow a user to begin accessing content at any time point in the content, instead of only at four-second intervals.

Implementations, described herein, may allow content providers to multicast streaming content using playlist-oriented streaming techniques, while also unicasting content (e.g., using non-playlist-oriented streaming techniques) to account for potential QoE degradations that may occur when changing channels. For example, in typical situations where playlist-oriented streaming techniques are used, a user would have to wait until the next segment is received before the next channel shows up when the user selects a new channel. Assume, for instance, that a user is watching channel 500, in a playlist-oriented system where segment files are sent every four seconds. When changing channels, the user may have to wait up to four seconds for the next channel to begin playing.

Figure 1B:
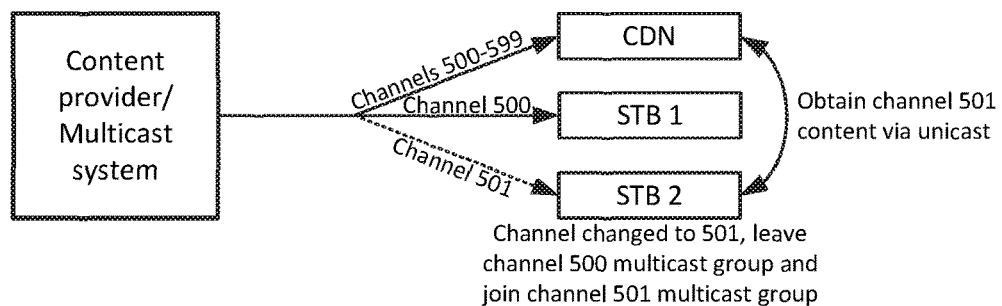
Figure 1C:
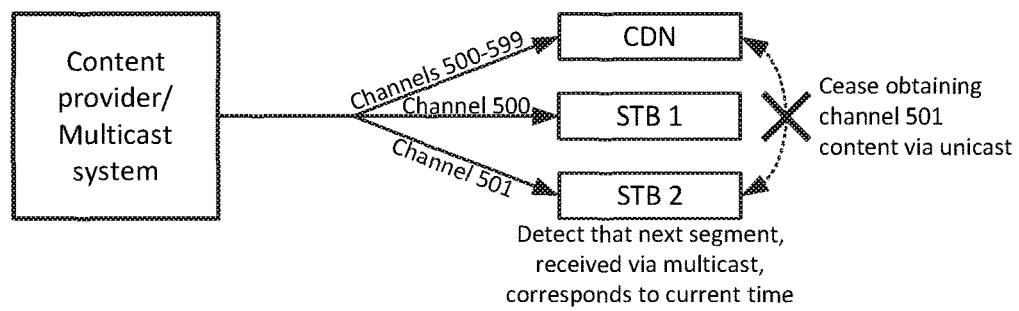

FIGS. 1A-1C illustrate an example implementation, which addresses the above issue. As shown in FIG. 1A, a content provider (in conjunction with a multicast system) may multicast, using a playlist-oriented streaming technique, segment files associated with a number of logical channels (e.g., television channels 500-599). Recipient devices may elect to receive one or more of the channels, such as by joining a multicast group associated with a desired channel. For example, as shown, two STBs ("STB 1" and "STB 2") may have joined the multicast group for channel 500. As also shown, a caching system (e.g., a content delivery network ("CDN")) may have joined the multicast group for all of the channels, and thus may receive all of the content multicasted from the content provider.

As shown in FIG. 1B, a user of STB 2 may change the desired channel to 501. Thus, STB 2 may leave the multicast group for channel 500, and join the multicast group for channel 501. However, as discussed above, there may be some "lag time" in between when the next segment, associated with channel 501, is scheduled to start playing. In order to reduce this lag time, and in accordance with some implementations, STB 2 may output a request for the content of channel 501 to be provided to STB 2, via unicast. That is, the request may correspond to the present time. As shown, STB 2 may output the request to the CDN, which is receiving the desired channel (i.e., channel 501). The CDN may transcode (e.g., decode and/or regarding-encode) the received content, from the content provider, into a format that can be unicasted to STB 2 (e.g., MPEG-TS). The CDN may output the requested content to STB 2 via unicast.

The content, transcoded and provided by the CDN, may correspond to some point, within a received segment file, that is not necessarily the start of the segment file. For example, the CDN may start unicasting the content one second after a four-second segment file begins, and the unicasted content may start at the one-second mark of the four-second segment (i.e., not at the start of the four-second segment). In this manner, the "lag time," in between when the next segment is scheduled to begin and the time that the user selects the new channel, may be filled by the unicasted content from the CDN. In some implementations, STB 2 may make the request directly to the content provider. This request may, in some implementations, be handled by the content provider (i.e., not by the CDN), or may be forwarded (e.g., by a Domain Name System ("DNS") server and/or some other network device) to the CDN.

As shown in FIG. 1C, once STB 2 detects that a segment file, received via multicast, corresponds to the present time (e.g., the segment file is "caught up"), then STB 2 may cease obtaining the streaming content via unicast, and may begin playing the received segment file. The above techniques may combine the resource-saving benefits of multicasting playlist-oriented content, along with the responsiveness of unicasting non-playlist-oriented content, in order to maximize the QoE of the user.

FIGS. 2A-2D illustrate an example of utilizing multicast and unicast in an adaptive bitrate ("ABR") scenario. ABR techniques may be used in order to provide content to recipient devices with diverse capabilities. For example, one recipient device (such as an STB) may be capable of receiving a high-bitrate ("HBR") content stream, while another recipient device may not be capable of receiving the HBR stream. These disparate capabilities may be due to, for example, subscribed bandwidth, varying qualities of network connections, and/or other factors.

Figure 2A:
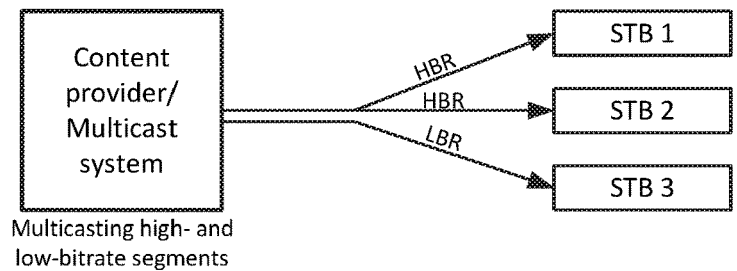

As shown in FIG. 2A, a content provider may multicast HBR and LBR segments of the same content (e.g., the same television channel). STBs 1 and 2 may receive the HBR versions of the content, while STB 3 may receive the LBR version of the content (e.g., based on joining respective multicast groups of the HBR and LBR versions).

Figure 2B:
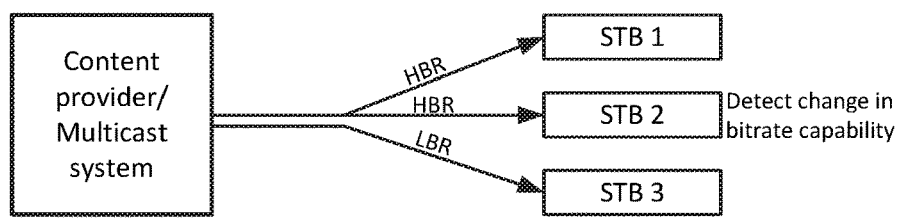
Figure 2C:
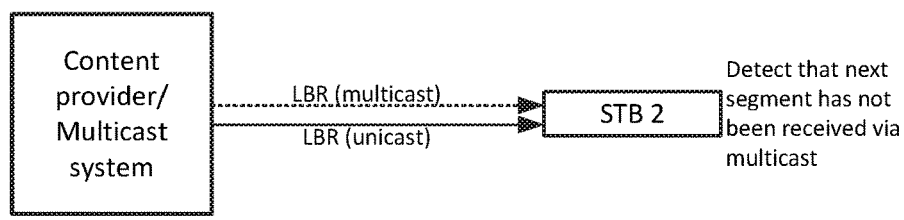

In FIG. 2B, STB 2 may detect a change in its bitrate capability. For instance, a network condition may reduce the ability of STB 2 to receive the HBR version of the content. As shown in FIG. 2C, STB 2 may join the multicast group of the LBR version of the content (and may also leave the multicast group of the HBR version of the content). As indicated by the dashed line, STB 2 may not immediately receive a segment file that corresponds to the next time a segment is scheduled to start. In order to mitigate this situation, STB 2 may also obtain, via unicast (and also using a non-playlist-oriented streaming technique) the LBR version of the content.

Figure 2D:
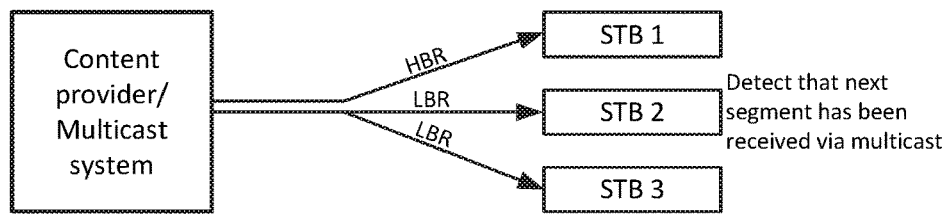

As shown in FIG. 2D, STB 2 may eventually detect that the next segment file has been received (i.e., a segment that corresponds to the next scheduled segment starting time). Based on detecting that the next segment file has been received, STB 2 may cease obtaining the LBR version of the content via unicast, and may obtain the LBR version of the content via multicast.

Figure 3:
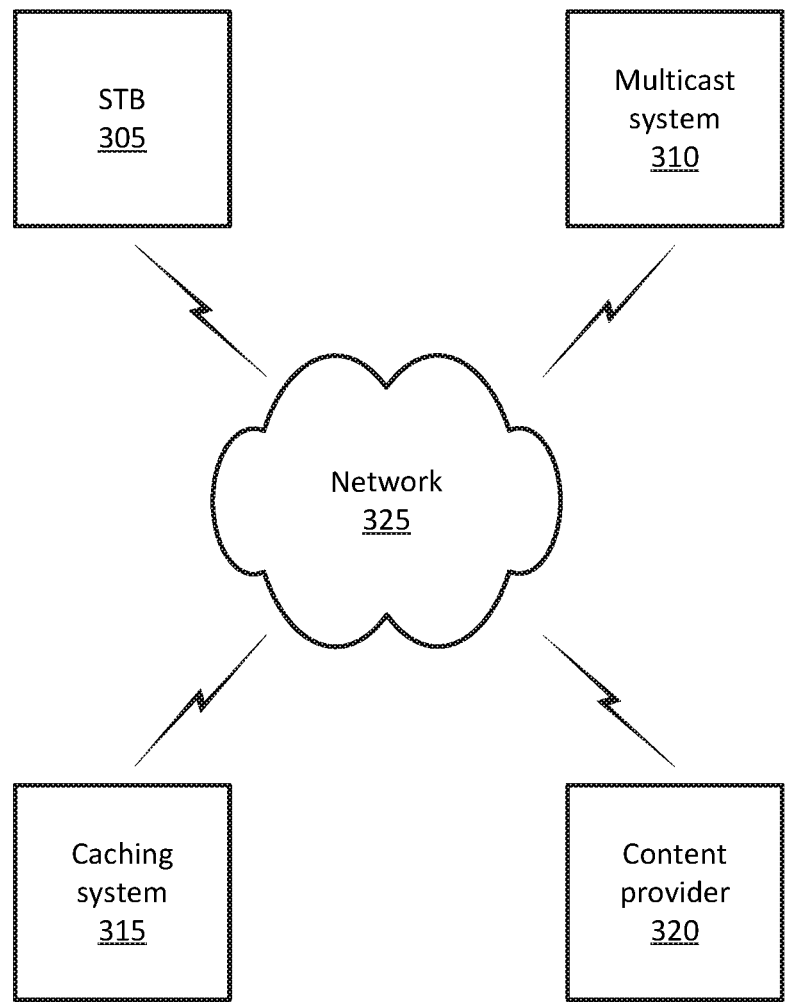
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include STB 305, multicast system 310, caching system 315, content provider 320, and network 325.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300. Also, while "direct" connections are shown in FIG. 3 between certain devices, some devices may communicate with each other via network 325 (and/or another network).

STB 305 may include any computation and communication device that is capable of communicating with one or more networks (e.g., network 325). For example, STB 305 may include a device that receives streaming content, such as audio and/or video content (such as television content, on-demand content, etc.), via an Internet connection and/or via some other delivery technique. In some implementations, STB 305 may be, or include, a "cable" set-top box associated with a television service provider. While described herein as a set-top box, STB 305 may include, may be a logical portion of, and/or may be substituted by another device, in some implementations. For example, in some implementations, STB 305 may include, be a logical portion of, and/or may be substituted by (i.e., processes described as being performed by STB 305 may instead be performed by) a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

Multicast system 310 may include one or more server devices (e.g., a single physical device or a distributed set of devices) that perform one or more functions related to multicasting content to one or more other devices. For instance, multicast system 310 may multicast content, from content provider 320, to multiple STBs 305 and/or multiple caching systems 315. Multicast system 310 may be Internet Protocol ("IP")-based, and/or may multicast content using some other type of protocol.

Caching system 315 may include one or more server devices (e.g., a single physical device or a distributed set of devices) that perform one or more functions related to caching content (e.g., content outputted by multicast system 310 or content provider 320). For example, caching system 315 may include one or more devices that are proximately and/or logically close to one or more STBs 305. Content requested by STB 305 may first be requested from caching system 315. In some implementations, caching system 315 may be, or include, one or more CDNs.

Content provider 320 may include one or more server devices (e.g., a single physical device or a distributed set of devices) that provide content (e.g., streaming content) to STB 305. Content provider 320 may receive requests from STB 305 for content (e.g., content specified in a particular playlist), and may provide the content to STB 305 in a streaming manner. In some implementations, content provider 320 may be, or may be communicatively coupled to, a CDN (e.g., caching system 315), which may cache content at "edges" of networks, in order to reduce the load within a network (e.g., within an Internet service provider's network).

Network 325 may include one or more radio access networks ("RANs"), via which STB 305 may access one or more other networks or devices, a core network of a wireless telecommunications network, an IP-based packet data network ("PDN"), a wide area network ("WAN") such as the Internet, a private enterprise network, and/or one or more other networks. In some implementations, network 325 may be, or include, a cellular network, such as a Long-Term Evolution ("LTE") network, a Third Generation ("3G") network, a Code Division Multiple Access ("CDMA") network, etc. STB 305 may connect, via network 325, to data servers, application servers, other user devices 305, etc. Network 325 may be connected to one or more other networks, such as a public switched telephone network ("PSTN"), a public land mobile network ("PLMN"), and/or another network.

Figure 4:
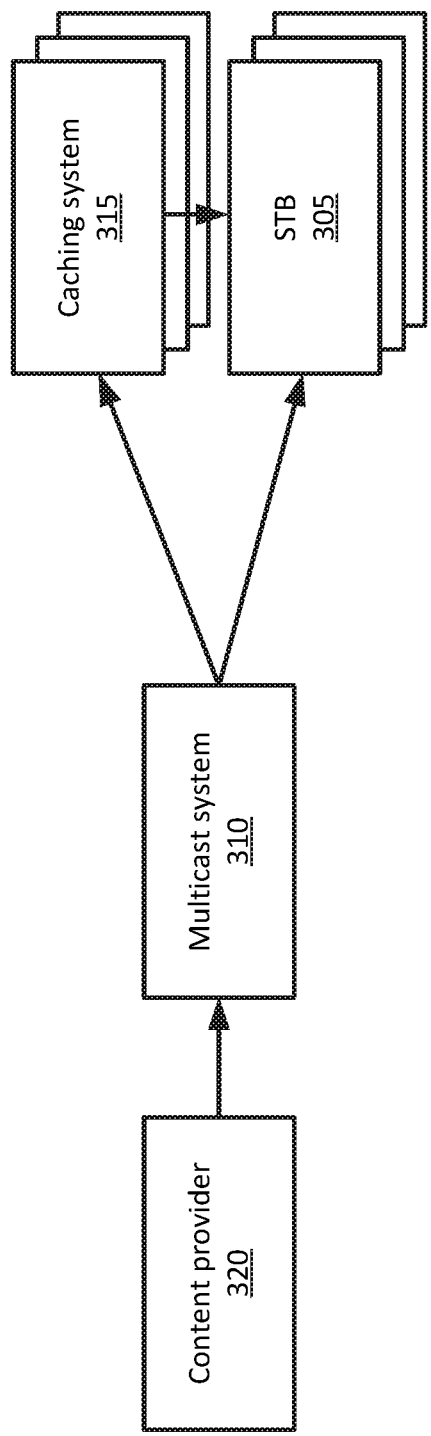
FIG. 4 illustrates an example signal flow, via which a content provider may output streaming content.

FIG. 4 illustrates an example signal flow, of content, from content provider 320. That is, FIG. 4 is one example, but in practice, content may reach STB 305 and/or caching system 315 via one or more other pathways. Additionally, for the sake of simplicity, additional devices, which may be in the signal path, are not shown. For example, the content may traverse one or more routers, gateways, hubs, switches, and/or other devices or networks, which are not shown in FIG. 4.

As shown, content provider 320, may output content to multicast system 310. In some implementations, content provider 320 and multicast system 310 may be an integrated device or set of devices. Multicast system 310 may use one or more multicast techniques to output the content to multiple STBs 305 and/or caching systems 315. In some implementations, caching system 315 may provide the content to STB 305 (e.g., may be in the signal path between multicast system 310 and STB 305). As also mentioned above, caching system 315 and/or content provider 320 may provide content to STB 305 in a unicast fashion.

Figure 5:
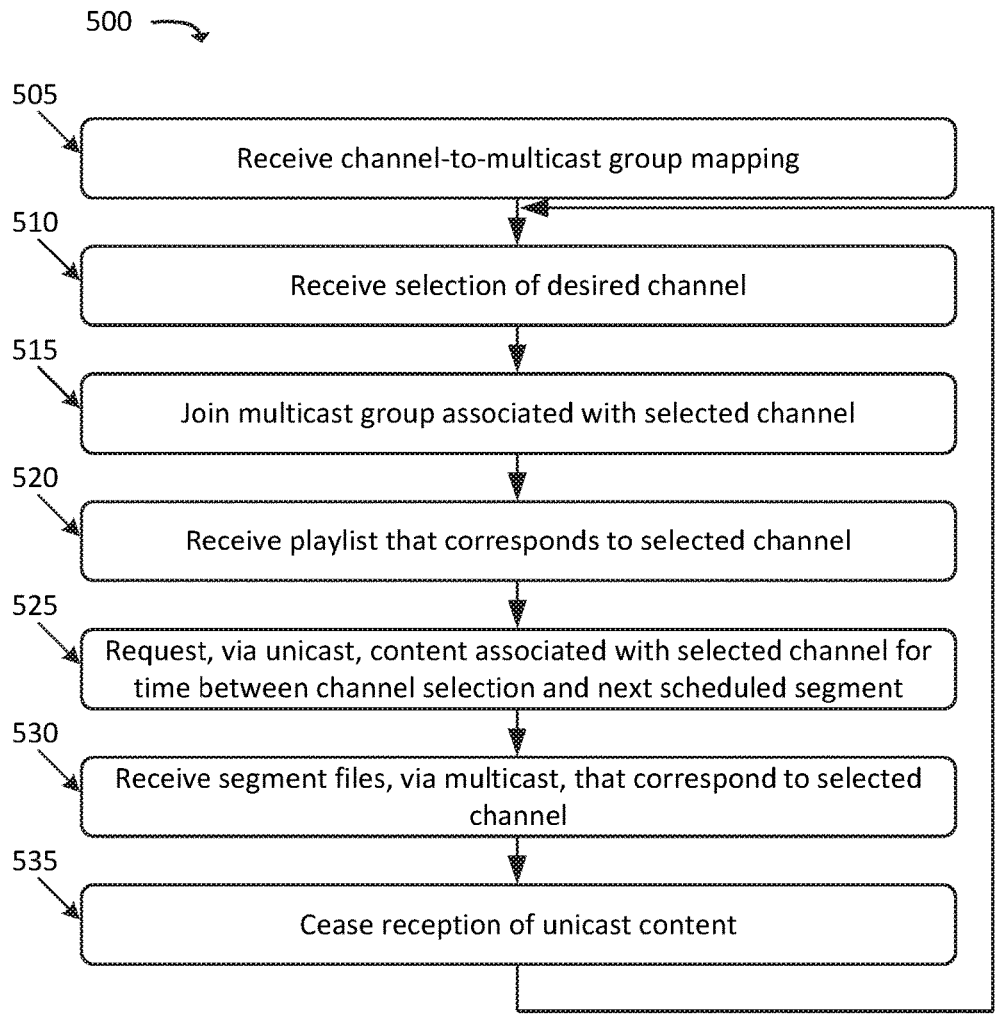
FIG. 5 illustrates an example process for using unicast to supplement the delivery of streaming multicast content when changing or selecting channels.

FIG. 5 illustrates an example process 500 for using unicast to supplement the delivery of streaming multicast content when changing or selecting channels. In some implementations, process 500 may be performed by STB 305. In other implementations, some or all of process 500 may be performed by one or more other devices in addition to, or in lieu of, STB 305.

As shown, process 500 may include receiving (at 505) a channel-to-multicast group mapping. For example, STB 305 may receive a mapping, from content provider 320 and/or from some other source, that indicates a mapping between multicast groups and channels. STB 305 may receive the mapping as part of an initial registration procedure, during an update, upon powering up, and/or at some other time.

Process 500 may also include receiving (at 510) a selection of a desired channel. For example, a user of STB 305 may select a particular logical channel that he or she wishes to access. The channel may be selected from a channel list or guide, may be selected by pressing a channel up/down button, may be manually entered, etc. The logical channel may correspond to a television channel and/or some other discrete channel via content (e.g., audio and/or video content) is provided.

Process 500 may additionally include joining (at 515) a multicast group associated with the selected channel. For example, STB 305 may output a notification and/or request to multicast system 310 and/or content provider 320, indicating that STB 305 has joined (or has requested to join) the multicast group associated with the channel. The multicast group may be identified by looking up the channel in the channel-to-multicast group mapping.

Process 500 may further include receiving (at 520) a playlist that corresponds to the selected channel. For instance, content provider 320 and/or multicast system 310 may output an HLS playlist, an MPEG-DASH playlist, and/or some other type of playlist, that corresponds to the desired content, to STB 305. In some implementations, the playlist may be provided to STB 305 based on the indication that STB 305 has joined the multicast group, may be outputted by content provider 320 and/or multicast system 310 as part of the multicasting of the content, and/or at some other time.

Process 500 may also include requesting (at 525), via unicast, content associated with the selected channel. The request may correspond to a time between the channel selection and the next scheduled segment. For example, STB 305 may output a request, to content provider 320, for the content. The request may, in some implementations, be forwarded to caching system 315 (e.g., in lieu of being received by content provider 320). In some implementations, STB 305 may make the request directly to caching system 315.

The request may identify the content (e.g., the desired channel, an identifier of the content, the identified multicast group, and/or by some other identifier). Caching system 315 and/or content provider 320 may determine a time at which the request was received (e.g., a time at which the channel selection was received by STB 305). Caching system 315 and/or content provider 320 may begin unicasting the requested content, that corresponds to the determined time, to STB 305. In some implementations, caching system 315 and/or content provider 320 may transcode one or more segment files (or a portion of a segment file) into a format that can be sent at an arbitrary time. For instance, caching system 315 and/or content provider 320 may transcode a portion of a segment file to an MPEG-TS and/or some other streaming format, and may output the transcoded segment file (or portion of a segment file) to STB 305.

STB 305 may play the received content in a content player application. By playing the content, received via unicast, delays may be avoided that would otherwise be associated with waiting for the playback to sync with the timing of the segment files that are sent to STB via multicast.

Alternatively, in some implementations, content provider 320 and/or caching system 315 may receive the indication that STB 305 has selected the channel (at 510) and/or that STB 305 has joined the multicast group (at 515). Based on this indication, content provider 320 and/or caching system 315 may unicast the content (e.g., transcoded content) to STB 305. In some such implementations, STB 305 may not request (at 525) the content via unicast, as the content may automatically be provided to STB 305 without such a request.

Process 500 may additionally include receiving (at 530) segment files, via multicast, that correspond to the selected channel. That is, while STB 305 receives the content via unicast, STB 305 may also be part of the multicast group associated with the content, and may be receiving segment files as they are outputted by multicast system 310 and/or content provider 320.

Process 500 may further include ceasing (at 535) reception of the unicast content. For instance, once STB 305 receives a segment file that corresponds to a next scheduled segment (e.g., as indicated by the playlist), STB 305 may output a notification to caching system 315 and/or content provider 320, indicating that the unicasting of the content should be stopped. In some implementations, the indication may indicate a stop time. In this manner, STB 305 may receive a segment file that corresponds to a future time (e.g., in ten seconds), and output a notification that the unicast should be stopped at that future time. The unicast may, however, continue in between the time the notification is received by caching system 315 and/or content provider 320, and the time that the next segment is scheduled to start.

In some implementations, STB 305 may cease the reception of the unicasted content at exactly the scheduled start time of the received segment file. In other implementations, STB 305 may cease the reception of the unicasted content at some other time, that is based on the scheduled start time of the received segment file. For instance, STB 305 may cease the reception of the unicasted content one second after the start time of the received segment file, two seconds after the start time of the received segment file, etc.

Some portions of process 500 may be repeated upon the selection of a new channel. For example, as shown, blocks 510-535 may be repeated when another channel is selected.

FIGS. 6A and 6B conceptually illustrate the delivery of content, as described above with respect to FIG. 5, to STB 305. For instance, FIG. 6A may conceptually illustrate the content, as it has been received by STB 305. In this example, assume that the content, that corresponds to example channel 1, is multicasted as five-second segment files. As shown, STB 305 may receive three segment files via multicast. These three segment files may represent fifteen seconds of content. At the 12-second mark (i.e., 12 seconds after the "0th" second of this example), STB 305 may receive a channel change selection. Based on this channel change, STB 305 may obtain, via unicast, content that starts at the 12-second mark. STB 305 may also receive, via multicast, a segment file that starts at the 15-second mark. This segment file may, in some implementations, be received in between the 12th second and the 15th second. Based on receiving this segment file, STB 305 may output a notification (e.g., to caching system 315 and/or content provider 320) that the next scheduled segment (i.e., the segment between 15 and 20 seconds) corresponds to a segment file, for the desired channel (i.e., channel 2, that has been successfully received). Based on this notification, caching system 315 and/or 320 may cease outputting the content, via unicast, to STB 305, at the 15-second mark.

FIG. 6B conceptually illustrates the content shown in FIG. 6A, as played by STB 305. As shown, STB 305 may play the channel 1 segment files, received via multicast, for the first 12 seconds (even though 15 seconds worth of segment files have been received). Between the 12th and the 15th second, the stream that corresponds to channel 2, received via unicast, may be played by STB 305. As mentioned above, the content during this time period may be provided via a non-playlist-oriented technique. This may result in a relatively fast transition between channel 1 and 2, thus resulting in a high QoE for the user. After the 15th second, STB 305 may play the received segment files that correspond to channel 2.

As may be apparent from the figure, the changing of the channels (from channel 1 to channel 2) may be performed in a relatively fast and responsive manner. That is, instead of waiting for the next segment to begin (i.e., the segment that starts at the 15-second mark), the content that corresponds to channel 2 may be presented immediately (or nearly immediately). Additionally, the switch from the unicasted channel 2 content to the multicasted channel 2 content (at the 15-second mark) may be performed seamlessly. That is, the switch may be performed without any skips, delays, or other types of indications that may be perceptible to a user of STB 305.

Figure 7:
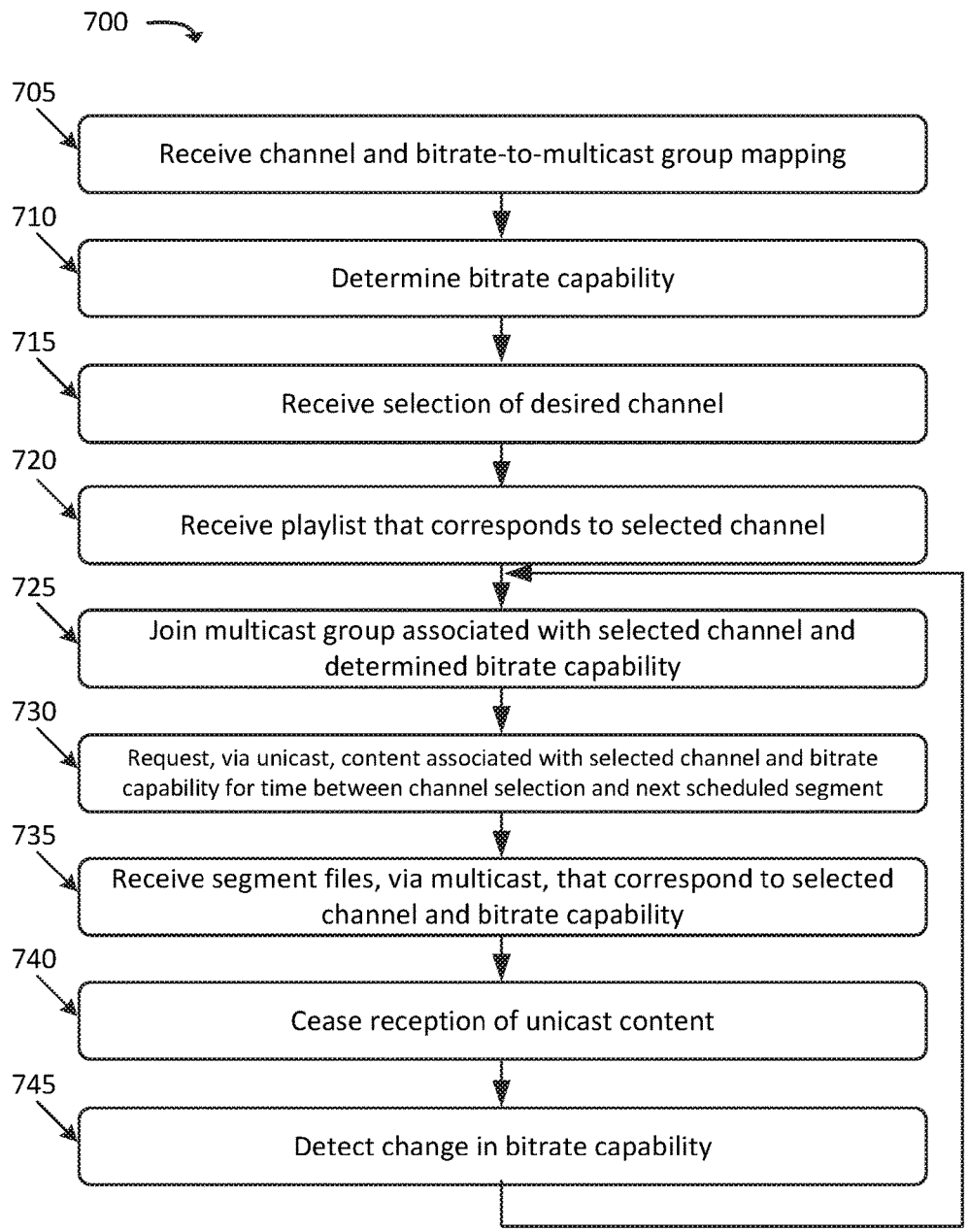
FIG. 7 illustrates an example process for unicast to supplement the delivery of streaming multicast content when changing bitrates of the content.

FIG. 7 illustrates an example process 700 for using unicast to supplement the delivery of streaming multicast content when changing bitrates. In some implementations, process 700 may be performed by STB 305. In other implementations, some or all of process 700 may be performed by one or more other devices in addition to, or in lieu of, STB 305.

As shown, process 700 may include receiving (at 705) a channel and bitrate-to-multicast group mapping. For example, in some implementations, multicast system 310 and/or content provider 320 may output multiple different versions of the same content, where the different versions correspond to different bitrates. Each multicast group may correspond to a different channel and bitrate. For instance, one multicast group may correspond to a particular channel at a first bitrate, while another multicast group may correspond to the same channel at a different bitrate.

Process 700 may also include determining (at 710) a bitrate capability. For example, STB 305 may perform a "speed test" and/or may determine its bitrate capability (e.g., a maximum bitrate supported by STB 305) in some other way. In some implementations, one or more external devices may determine the bitrate capability of STB 305, and may notify STB 305 of the bitrate capability of STB 305.

Process 700 may additionally include receiving (at 715) a selection of a desired channel. For instance, a user of STB 305 may input a channel that he or she wishes to view.

Process 700 may further include receiving (at 720) a playlist that corresponds to the selected channel. The playlist may indicate segment files that correspond to the determined bitrate capability and the selected channel.

Process 700 may also include joining (at 725) a multicast group associated with the selected channel and the determined bitrate capability. STB 305 may receive segment files associated with the channel and the determined bitrate capability. However, as discussed above, there may be lag time in between the channel change request and the start time of the next received segment file.

Process 700 may additionally include requesting (at 730) content, associated with the selected channel and the determined bitrate capability. The request may be a request for the content to be provided via unicast and/or via a non-playlist-oriented streaming technique. The request may be a request for the desired content between the channel selection and the next scheduled segment.

Process 700 may further include receiving (at 735) the segment files, via multicast, that correspond to the selected channel and bitrate capability. Once the next scheduled segment file is received, process 700 may also include ceasing (at 740) the reception of the unicast content.

Blocks 725-740 may be repeated when a change in the bitrate capability, of STB 305, is detected (at 745). For instance, STB 305 and/or some other device may monitor the bitrate capability of STB 305 on an ongoing basis. If the bitrate capability increases or decreases, the user's QoE may be improved by obtaining a higher or lower bitrate version of the content. For instance, if network conditions degrade, a lower bitrate may be used, while a higher bitrate may provide higher fidelity content when network conditions allow.

FIGS. 8A, 8B, 9A, and 9B conceptually illustrate the delivery of content, as described above with respect to FIG. 7, to STB 305. These figures illustrate different behaviors, according to some implementations, which may differ based on whether a lower bitrate stream is being changed to a higher bitrate stream, or vice versa.

As shown in FIG. 8A, STB 305 may receive, via multicast, segment files that correspond to an LBR version of example channel 1. At the 7th second, STB 305 may detect a change in the bitrate capability of STB 305. Specifically, in this example, STB 305 may detect that the bitrate capability of STB 305 has increased, to the point that STB 305 is capable of receiving and playing the HBR version of the content. At the 7th second, STB 305 may request that the HBR version of the content be unicasted to STB 305. As further shown, a segment file, that corresponds to the 10th second (i.e., a segment file that corresponds to the next scheduled segment) may not be received. STB 305 may continue receiving, via unicast, the HBR version of the content. At some point, the segment file, that corresponds to the 15th second, may be received. STB 305 may output a notification, indicating that this segment file has been received, and that the unicast stream should be closed at the 15th second.

FIG. 8B conceptually illustrates the content shown in FIG. 8A, as played by STB 305. As shown, STB 305 may play the LBR versions of the content, received via multicast, for the first 7 seconds. At the 7th second, since a higher bitrate version is available, STB 305 may begin playing the HBR version (received via unicast), even though the LBR segment file still has 3 seconds left. Once the next available segment starts (i.e., the 15-second mark, in this example), STB 305 may begin playing the HBR segment file.

Figure 9A:
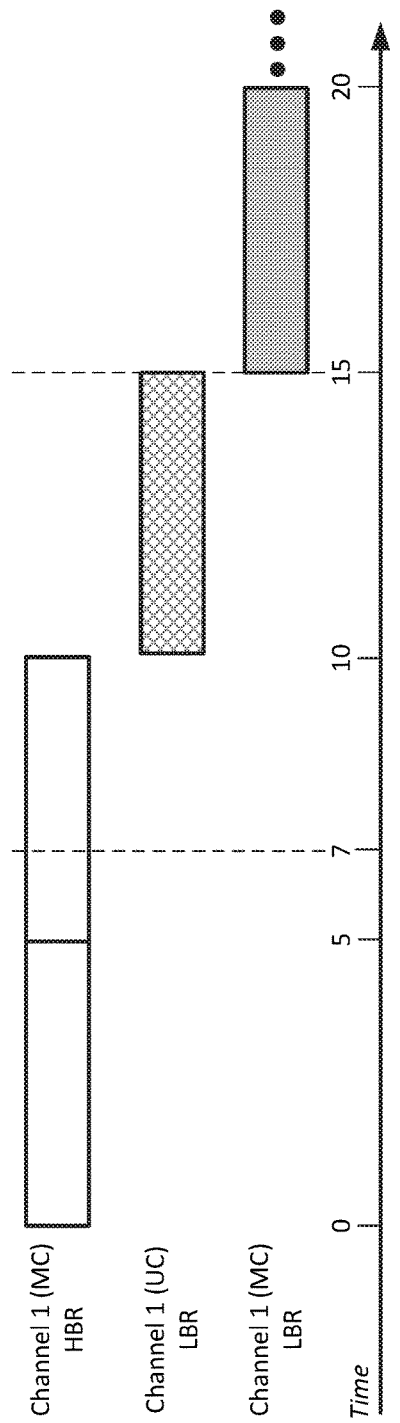

As shown in FIG. 9A, STB 305 may receive, via multicast, segment files that correspond to an HBR version of example channel 1. At the 7th second, STB 305 may detect a change in the bitrate capability of STB 305. Specifically, in this example, STB 305 may detect that the bitrate capability of STB 305 has decreased, to the point that STB 305 is not capable of receiving and playing the HBR version of the content (but is capable of playing the LBR version). STB 305 may request that the LBR version of the content be unicasted to STB 305, beginning at the 10th second. That is, while the decreased bitrate capability was detected at the 7th second, STB 305 may have received the segment file before the decreased bitrate capability was detected, and may play the remainder of the segment file. At the 10th second, in this example, the next segment file may not have yet been received (i.e., a segment file that corresponds to the 10th though 15th-second segment). Since this segment file has not been received, STB 305 may obtain the content via unicast (in some implementations, using a non-playlist-oriented streaming technique). At some point, the segment file, that corresponds to the segment starting at the 15th second, may be received. STB 305 may output a notification, indicating that this segment file has been received, and that the unicast stream should be closed at the 15th second.

Figure 9B:
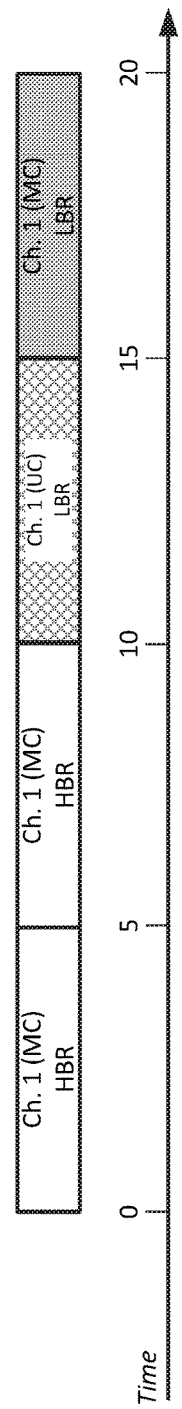

FIG. 9B conceptually illustrates the content shown in FIG. 9A, as played by STB 305. As shown, STB 305 may play the HBR versions of the content, received via multicast, for the first 10 seconds. At the 10th second, since the HBR version is no longer available, STB 305 may begin playing the LBR version (received via unicast). Once the next available segment starts (i.e., the 15-second mark, in this example), STB 305 may begin playing the LBR segment file.

Figure 10:
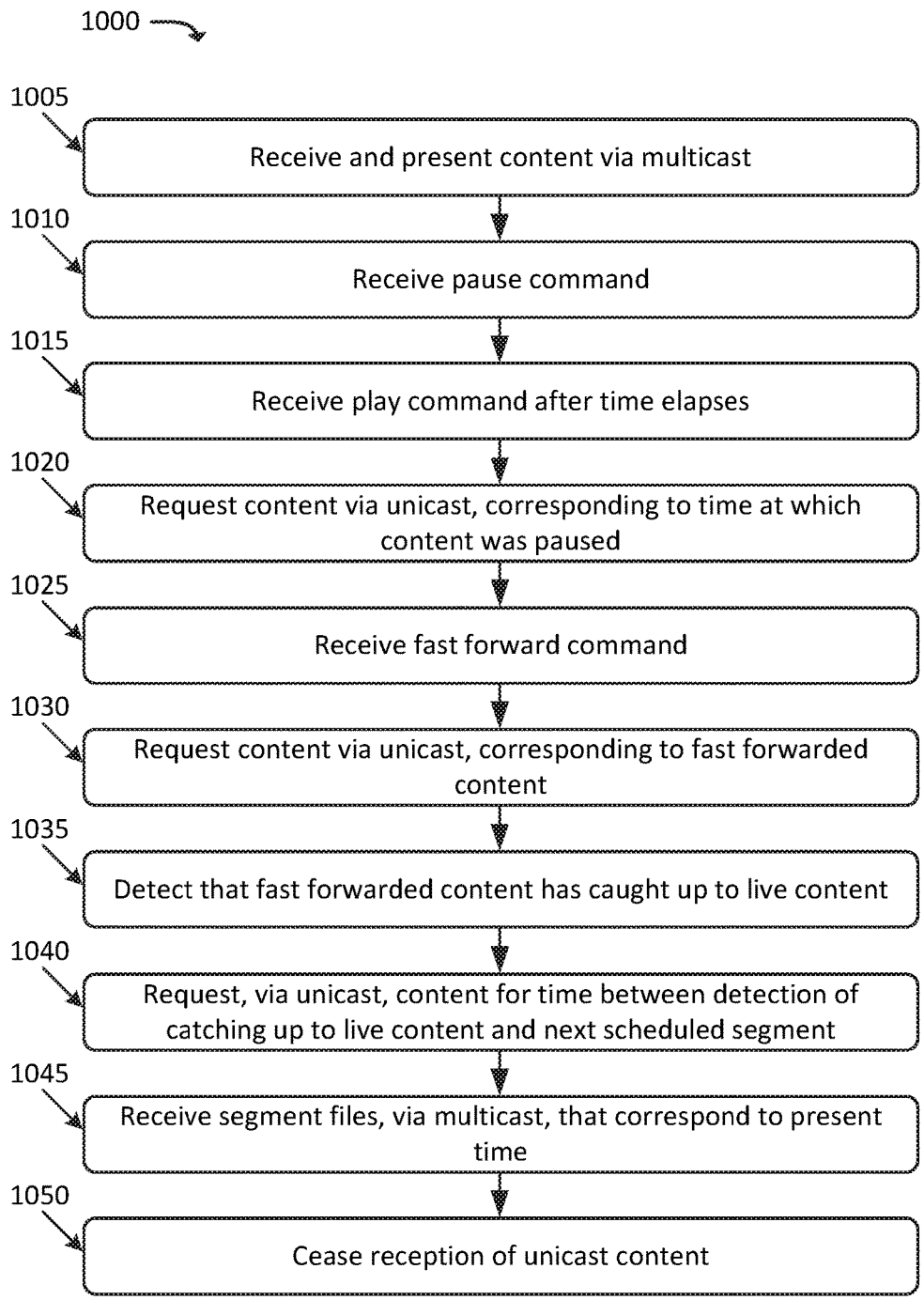
FIG. 10 illustrates an example process for unicast to supplement the delivery of streaming multicast content when performing time-shifting operations.

While the above concepts are described in the context of changing channels or changing bitrates, similar techniques (i.e., the use of unicast and/or non-playlist-oriented streaming to supplement the use of multicast and/or playlist-oriented streaming) may be applied in different situations. For example, FIG. 10 illustrates a process 1000 for using unicast to supplement the delivery of streaming multicast content when time-shifting operations are performed (e.g., pause, fast forward, slow forward, or rewind) during the presentation of content. In some implementations, process 1000 may be performed by STB 305. In other implementations, some or all of process 1000 may be performed by one or more other devices in addition to, or in lieu of, STB 305.

As shown, process 1000 may include receiving and presenting (at 1005) content, received via a multicast technique. For example, process 1000 may take place after process 500 or 700, or another process in which STB 305 has joined a multicast group for a given channel, and is receiving the corresponding content via the multicast group.

Process 1000 may also include receiving (at 1010) a pause command. For instance, STB 305 may implement time-shifting functions, which allow a user to pause, fast forward, rewind, etc. In some implementations, STB 305 may perform such techniques without buffering or receiving content that is not presently presented. For instance, when the pause command is received, STB 305 may leave the multicast group and/or may otherwise cease receiving or processing the content associated with the channel. In this manner, STB 305 may conserve network resources by not receiving content that is not presently being shown at STB 305. Additionally, STB 305 may be able to be designed and/or manufactured with reduced cost, compared to STBs that include and/or utilize memory devices that are able to store and/or buffer significant amounts of content (e.g., one minute of content, 45 minutes of content, one hour of content, etc.). Further still, such techniques may be able to be used by legacy STBs 305 that can be reprogrammed, but are not equipped with hardware (e.g., memory devices) that can store significant amounts of content.

Process 1000 may additionally include receiving (at 1015) a play command, after some time elapses. For instance, after one minute, five minutes, etc., a user of STB 305 may input a play command, indicating that he or she would like to resume the presentation of content.

Process 1000 may further include requesting (at 1020) content via unicast, corresponding to the time at which the content was paused. For instance, STB 305 may output a request to caching system 315 and/or content provider 320 for the content, beginning at the time at which the content was paused (at 1010). STB 305 may present the content upon receiving the content via unicast, and may continue to receive and present the content.

Process 1000 may also include receiving (at 1025) a fast forward command. For example, during the presentation of the content (after having previously paused the content at 1010), the user of STB 305 may input a fast forward command.

Process 1000 may additionally include requesting (at 1030) content via unicast, corresponding to the fast forwarded content. For instance, STB 305 may output a request to caching system 315 and/or content provider 320 for a fast forwarded version of the content. The fast forwarded version of the content may be provided at 1.5× speed, double speed, quadruple speed, and/or some other speed that is either predetermined by content provider 320 or is specified by the user of STB 305.

Process 1000 may further include detecting (at 1035) that the fast forwarded content has caught up to the live content. For instance, when the content continues to fast forward over time, it will eventually be synchronized, in time, with the live content that is being multicasted by content provider 320 (and/or by multicast system 310 or caching system 315).

Process 1000 may also include requesting (at 1040), via unicast, content for the time between the detection (at 1035) that the fast forwarded content has caught up to the live content, and the next scheduled segment. For example, as similarly described above, STB 305 may join (or may have previously joined) a multicast group associated with the content, and may have received a playlist associated with the multicast group. The request (at 1040) for the unicast content may be made in order to receive the content quickly, instead of waiting for the next scheduled multicast segment.

Process 1000 may additionally include receiving (at 1045) segment files, via multicast, that correspond to the present time, and may cease (at 1050) the reception of unicast content upon the reception of the segment files that correspond to the present time.

Figure 11:
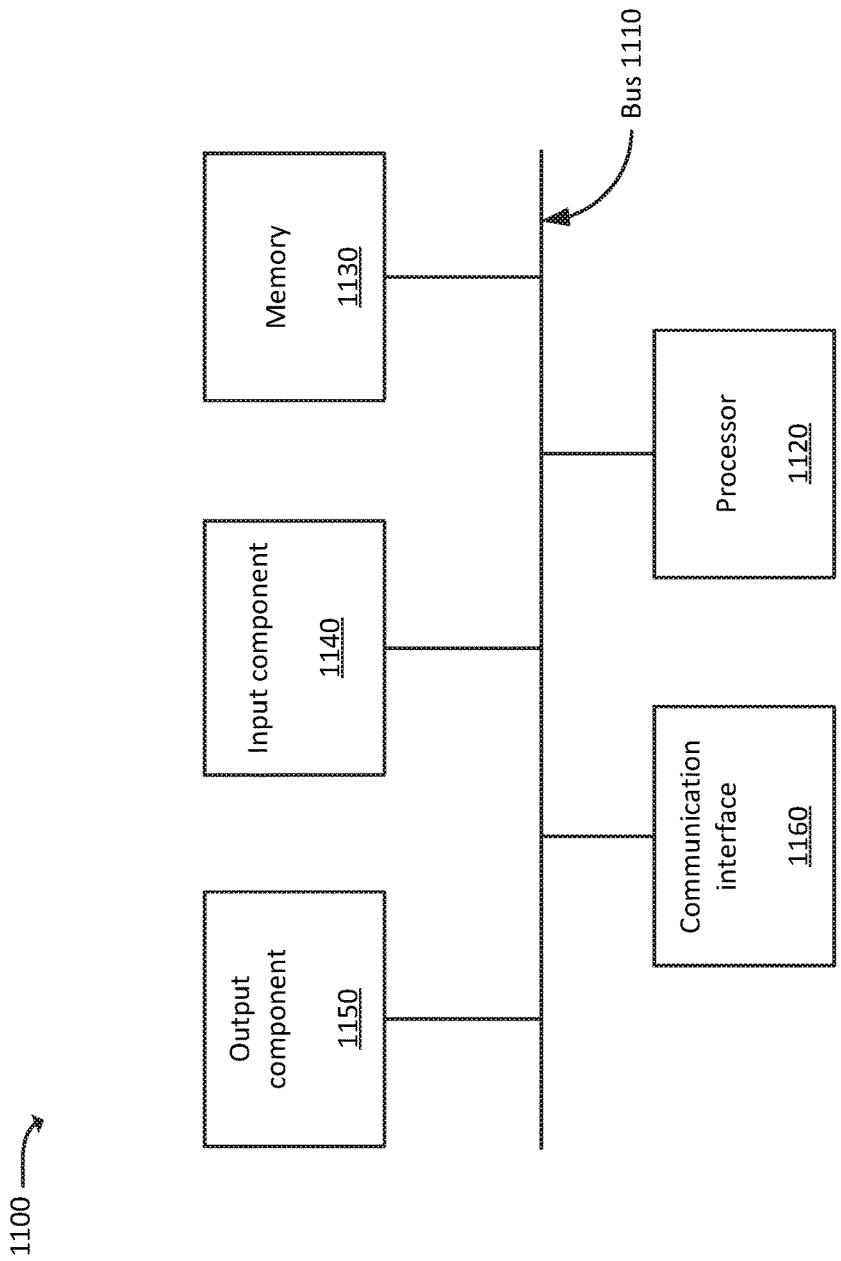
FIG. 11 illustrates example components of a device, in accordance with some implementations described herein.

FIG. 11 is a diagram of example components of device 1100. One or more of the devices described above may include one or more devices 1100. Device 1100 may include bus 1110, processor 1120, memory 1130, input component 1140, output component 1105, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1105 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

As another example, in some implementations, various techniques, some examples of which have been described above, may be used in combination, even though such combinations are not explicitly discussed above. Furthermore, some of the techniques, in accordance with some implementations, may be used in combination with conventional techniques.

Additionally, while series of blocks and/or signals have been described with regard to FIGS. 4, 5, and 7, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Furthermore, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information.

Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
   a non-transitory computer-readable medium storing a set of processor-executable instructions; and
   one or more processors configured to execute the set of processor-executable instructions, wherein executing the set of processor-executable instructions causes the one or more processors to:
   receive a selection of a desired logical channel;
   join a multicast group associated with the desired logical channel, to obtain multicasted streaming content that corresponds to the desired logical channel;
   output, based on joining the multicast group, a request for unicast content that corresponds to the desired logical channel;
   receive, based on the request and via a unicast technique, streaming content that:
   corresponds to the desired logical channel, and
   is streamed using a non-playlist-oriented streaming technique;
   receive multicasted streaming content, corresponding to the desired logical channel, via a multicast technique and based on joining the multicast group, the multicasted streaming content including one or more segment files associated with a playlist-oriented streaming technique;
   determine that a particular segment file, of the one or more received segment files, has a start time that corresponds to a future time segment that starts after joining the multicast group; and
   cease, at a time that corresponds to the start time of the particular segment file, reception of the streaming content via the unicast technique.

2. The user device of claim 1, wherein executing the set of processor-executable instructions further causes the one or more processors to:
   present the streaming content, received via the unicast technique, before the start of the future time segment; and
   at the start of the future time segment, present the particular segment file, received via the multicast technique, in lieu of the streaming content, received via the unicast technique.

3. The user device of claim 1, wherein executing the set of processor-executable instructions further causes the one or more processors to:
   receive a mapping between logical channels and multicast groups; and
   identify, based on the mapping, a particular multicast group that corresponds to the desired channel,
   wherein the joined multicast group is the identified particular multicast group.

4. The user device of claim 1, wherein the multicast group is a first multicast group associated with a first bitrate, wherein the particular segment file is a first segment file, wherein the future time segment is a first future time segment, wherein executing the set of processor-executable instructions further causes the one or more processors to:
   detect a change in bitrate capability of the user device;
   join a second multicast group, associated with the desired logical channel and a second bitrate;
   output, based on joining the second multicast group, a request for content that corresponds to the desired logical channel and the second bitrate;
   receive, based on the request for content that corresponds to the desired logical channel and the second bitrate, and via the unicast technique, streaming content that:
   corresponds to the desired logical channel and the second bitrate, and
   is streamed using the non-playlist-oriented streaming technique;
   determine that a second segment file has been received via the multicast technique, the second segment file having a start time that corresponds to a second future time segment that starts after joining the second multicast group; and
   cease, at a time that corresponds to the start time of the second segment file, reception of the streaming content, that corresponds to the desired logical channel and the second bitrate, via the unicast technique.

5. The user device of claim 4, wherein the first bitrate is a higher bitrate than the second bitrate,
   wherein the change in the bitrate capability is detected during playback of a presently-playing segment file that corresponds to the first bitrate;
   wherein executing the set of processor-executable instructions further causes the one or more processors to:
   present the remainder of the presently-playing segment file; and
   present the streaming content, that corresponds to the desired logical channel and the second bitrate and is received via the unicast technique, after an ending time of the presently-playing segment file.

6. The user device of claim 4, wherein the first bitrate is a lower bitrate than the second bitrate,
   wherein the change in the bitrate capability is detected during playback of a presently-playing segment file that corresponds to the first bitrate;
   wherein executing the set of processor-executable instructions further causes the one or more processors to interrupt playback of the presently-playing segment file by presenting the streaming content, that corresponds to the desired logical channel and the second bitrate and is received via the unicast technique, before an ending time of the presently-playing segment file.

7. The user device of claim 1, wherein the playlist-oriented streaming technique includes at least one of:
Hypertext Transfer Protocol ("HTTP") Live Streaming ("HLS"), or
Motion Picture Experts Group ("MPEG") Dynamic Adaptive Streaming over HTTP ("DASH").

8. A method, comprising:
receiving, by a user device, a selection of a desired logical channel, the desired logical channel being associated with streaming content that is provided, via a multicast technique, by a content provider,
the streaming content further being streamed using a playlist-oriented streaming technique, in which the content provider outputs segment files that each correspond to a predetermined time segment;
joining, by the user device, a multicast group associated with the desired logical channel;
outputting, by the user device and based on joining the multicast group, a request for content that corresponds to the desired logical channel;
receiving, by the user device and based on the request and via a unicast technique, streaming content that:
corresponds to the desired logical channel, and
is streamed using a non-playlist-oriented streaming technique;
determining, by the user device, that a particular segment file has been received via the multicast technique, the particular segment file having a start time that corresponds to a future time segment that starts after joining the multicast group; and
ceasing, by the user device and at a time that corresponds to the start time of the particular segment file, reception of the streaming content via the unicast technique.

9. The method of claim 8, further comprising:
presenting the streaming content, received via the unicast technique, before the start of the future time segment; and
at the start of the future time segment, presenting the particular segment file, received via the multicast technique, in lieu of the streaming content, received via the unicast technique.

10. The method of claim 8, further comprising:
receiving a mapping between logical channels and multicast groups; and
identifying, based on the mapping, a particular multicast group that corresponds to the desired channel,
wherein the joined multicast group is the identified particular multicast group.

11. The method of claim 8, wherein the multicast group is a first multicast group associated with a first bitrate, wherein the particular segment file is a first segment file, wherein the future time segment is a first future time segment, the method further comprising:
detecting a change in bitrate capability of the user device;
joining a second multicast group, associated with the desired logical channel and a second bitrate;
outputting, based on joining the second multicast group, a request for content that corresponds to the desired logical channel and the second bitrate;
receiving, based on the request for content that corresponds to the desired logical channel and the second bitrate, and via the unicast technique, streaming content that:
corresponds to the desired logical channel and the second bitrate, and
is streamed using the non-playlist-oriented streaming technique;
determining that a second segment file has been received via the multicast technique, the second segment file having a start time that corresponds to a second future time segment that starts after joining the second multicast group; and
ceasing, at a time that corresponds to the start time of the second segment file, reception of the streaming content, that corresponds to the desired logical channel and the second bitrate, via the unicast technique.

12. The method of claim 11, wherein the first bitrate is a higher bitrate than the second bitrate,
wherein the change in the bitrate capability is detected during playback of a presently-playing segment file that corresponds to the first bitrate;
the method further comprising:
presenting the remainder of the presently-playing segment file; and
presenting the streaming content, that corresponds to the desired logical channel and the second bitrate and is received via the unicast technique, after an ending time of the presently-playing segment file.

13. The method of claim 11, wherein the first bitrate is a lower bitrate than the second bitrate,
wherein the change in the bitrate capability is detected during playback of a presently-playing segment file that corresponds to the first bitrate;
the method further comprising interrupting playback of the presently-playing segment file by presenting the streaming content, that corresponds to the desired logical channel and the second bitrate and is received via the unicast technique, before an ending time of the presently-playing segment file.

14. The method of claim 8, wherein the playlist-oriented streaming technique includes at least one of:
Hypertext Transfer Protocol ("HTTP") Live Streaming ("HLS"), or
Motion Picture Experts Group ("MPEG") Dynamic Adaptive Streaming over HTTP ("DASH").

15. A non-transitory computer-readable medium, storing processor-executable instructions, which, when executed by one or more processors of a user device, cause the one or more processors to:
receive a selection of a desired logical channel that is associated with streaming content that is streamed, via a multicast technique, using a playlist-oriented streaming technique, in which the streaming content includes segment files that each correspond to a predetermined time segment;
join a multicast group associated with the desired logical channel;
output, based on joining the multicast group, a request for content that corresponds to the desired logical channel;
receive, based on the request and via a unicast technique, streaming content that:
corresponds to the desired logical channel, and
is streamed using a non-playlist-oriented streaming technique;
determine that a particular segment file has been received via the multicast technique, the particular segment file having a start time that corresponds to a future time segment that starts after joining the multicast group; and cease, at a time that corresponds to the start time of the particular segment file, reception of the streaming content via the unicast technique.

16. The non-transitory computer-readable medium of claim 15, further configured to:

present the streaming content, received via the unicast technique, before the start of the future time segment;

at the start of the future time segment, present the particular segment file, received via the multicast technique, in lieu of the streaming content, received via the unicast technique.

17. The non-transitory computer-readable medium of claim 15, further comprising instructions to:

receive a mapping between logical channels and multicast groups; and identify, based on the mapping, a particular multicast group that corresponds to the desired channel, wherein the joined multicast group is the identified particular multicast group.

18. The non-transitory computer-readable medium of claim 15, wherein the multicast group is a first multicast group associated with a first bitrate, wherein the particular segment file is a first segment file, wherein the future time segment is a first future time segment, the processor-executable instructions further comprising instructions to:

detect a change in bitrate capability of the user device;

join a second multicast group, associated with the desired logical channel and a second bitrate;

output, based on joining the second multicast group, a request for content that corresponds to the desired logical channel and the second bitrate;

receive, based on the request for content that corresponds to the desired logical channel and the second bitrate, and via the unicast technique, streaming content that:

corresponds to the desired logical channel and the second bitrate, and is streamed using the non-playlist-oriented streaming technique;

determine that a second segment file has been received via the multicast technique, the second segment file having a start time that corresponds to a second future time segment that starts after joining the second multicast group; and cease, at a time that corresponds to the start time of the second segment file, reception of the streaming content, that corresponds to the desired logical channel and the second bitrate, via the unicast technique.

19. The non-transitory computer-readable medium of claim 18, wherein the first bitrate is a higher bitrate than the second bitrate, wherein the change in the bitrate capability is detected during playback of a presently-playing segment file that corresponds to the first bitrate;

the processor-executable instructions further comprising instructions to:

present the remainder of the presently-playing segment file; and present the streaming content, that corresponds to the desired logical channel and the second bitrate and is received via the unicast technique, after an ending time of the presently-playing segment file.

20. The non-transitory computer-readable medium of claim 18, wherein the first bitrate is a lower bitrate than the second bitrate, wherein the change in the bitrate capability is detected during playback of a presently-playing segment file that corresponds to the first bitrate;

the processor-executable instructions further comprising instructions to interrupt playback of the presently-playing segment file by presenting the streaming content, that corresponds to the desired logical channel and the second bitrate and is received via the unicast technique, before an ending time of the presently-playing segment file.

* * * * *